(12) United States Patent
Jo et al.

(10) Patent No.: US 11,846,761 B2
(45) Date of Patent: Dec. 19, 2023

(54) OPTICAL IMAGING SYSTEM

(71) Applicant: Samsung Electro-Mechanics Co., Ltd., Suwon-si (KR)

(72) Inventors: Yong Joo Jo, Suwon-si (KR); Hag Chul Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 380 days.

(21) Appl. No.: 16/940,617

(22) Filed: Jul. 28, 2020

(65) Prior Publication Data
US 2021/0072511 A1 Mar. 11, 2021

(30) Foreign Application Priority Data
Sep. 10, 2019 (KR) .................. 10-2019-0112384

(51) Int. Cl.
*G02B 9/60* (2006.01)
*G02B 13/00* (2006.01)
*G02B 27/64* (2006.01)
*G02B 27/00* (2006.01)
*G02B 13/02* (2006.01)
*H04N 23/55* (2023.01)

(52) U.S. Cl.
CPC ........... *G02B 13/0065* (2013.01); *G02B 9/60* (2013.01); *G02B 13/0045* (2013.01); *G02B 13/02* (2013.01); *G02B 27/0025* (2013.01); *G02B 27/646* (2013.01); *H04N 23/55* (2023.01)

(58) Field of Classification Search
None
See application file for complete search history.

(56) References Cited

U.S. PATENT DOCUMENTS 7,509,040 B2  3/2009  Nomura
8,295,694 B2 * 10/2012 Sogoh ................. G02B 27/646
                                                  359/557

(Continued)

FOREIGN PATENT DOCUMENTS

CN  1650213 A   8/2005
CN  1782852 A   6/2006

(Continued)

OTHER PUBLICATIONS

Korean Office Action dated Aug. 13, 2021 in counterpart of Korean Patent Application No. 10-2021-0066333 (6 pages in English and 5 pages in Korean).

(Continued)

*Primary Examiner* — Darryl J Collins
(74) *Attorney, Agent, or Firm* — NSIP Law

(57) ABSTRACT

An optical imaging system includes a reflective member having a reflective surface for changing an optical path of light, a first lens having positive refractive power, a second lens having negative refractive power, a third lens, a fourth lens, and a fifth lens. The first lens to the fifth lens are sequentially disposed along an optical axis from an object side and are each disposed closer to an image sensor than the reflective member. The optical imaging system satisfies 0.2 mm<C1.0<0.3 mm, where C1.0 is a distance by which the image sensor moves in a direction perpendicular to the optical axis with respect to a shake amount of 1.0° measured by a shake detection unit.

18 Claims, 6 Drawing Sheets

(56) References Cited

U.S. PATENT DOCUMENTS

| | | | |
|---|---|---|---|
| 10,649,176 B2 | 5/2020 | Yoo | |
| 2005/0068634 A1 | 3/2005 | Miyatake et al. | |
| 2006/0115254 A1 | 6/2006 | Nomura | |
| 2011/0058799 A1 | 3/2011 | Chung et al. | |
| 2016/0109692 A1 | 4/2016 | Shibata | |
| 2018/0143403 A1* | 5/2018 | Tseng | G02B 13/0065 |
| 2018/0180847 A1 | 6/2018 | Yoo | |
| 2019/0004289 A1 | 1/2019 | Liao et al. | |
| 2019/0121103 A1 | 4/2019 | Bachar et al. | |
| 2021/0018725 A1* | 1/2021 | Hsu | H04N 5/2254 |

FOREIGN PATENT DOCUMENTS

| | | |
|---|---|---|
| CN | 105452930 A | 3/2016 |
| CN | 108254997 A | 7/2018 |
| KR | 10-2006-0061267 A | 6/2006 |
| KR | 10-0663276 B1 | 1/2007 |
| KR | 10-2010-0023179 A | 3/2010 |
| KR | 10-2011-0025314 A | 3/2011 |
| KR | 10-2018-0076894 A | 7/2018 |
| KR | 10-2018-0125989 A | 11/2018 |
| KR | 10-2019-0035634 A | 4/2019 |

OTHER PUBLICATIONS

Chinese Office Action dated Dec. 13, 2021 in corresponding Chinese Patent Application No. 202010940468.4 (9 pages in English and 9 pages in Chinese).

Korean Office Action dated Aug. 26, 2020 in counterpart Korean Patent Application No. 10-2019-0112384 (4 pages in English, 4 pages in Korean).

Korean Office Action dated Jan. 6, 2023, in counterpart Korean Patent Application No. 10-2022-0063007 (5 pages in English, 4 pages in Korean).

Korean Office Action dated Jul. 27, 2023, in corresponding Korean Patent Application No. 10-2022-0063007 (5 pages in English, 4 pages in Korean).

* cited by examiner

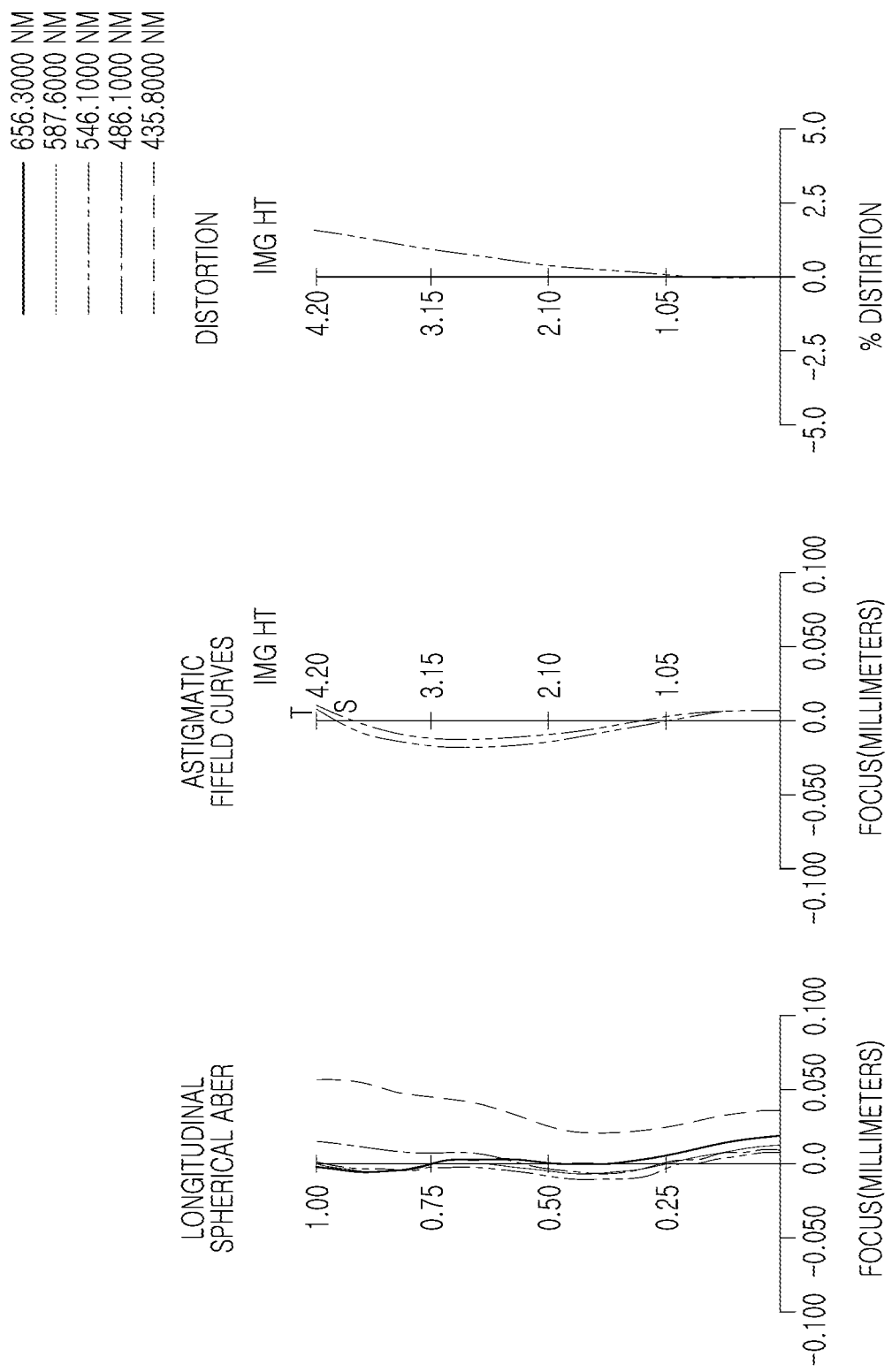

OPTICAL IMAGING SYSTEM

CROSS-REFERENCE TO RELATED APPLICATION(S)

This application claims the benefit under 35 USC 119(a) of Korean Patent Application No. 10-2019-0112384 filed on Sep. 10, 2019 in the Korean Intellectual Property Office, the entire disclosure of which is incorporated herein by reference for all purposes.

BACKGROUND

1. Field

The following description relates to an optical imaging system.

2. Description of Related Art

Cameras are used in portable electronic devices such as smartphones, and in accordance with the demand for the miniaturization of portable electronic devices, miniaturization of cameras mounted in portable electronic devices has also been required.

Furthermore, a telephoto camera has been adopted in portable electronic devices to obtain a zoom effect for imaging a subject with a narrow angle of view.

However, when a plurality of lenses is disposed in the thickness direction of the portable electronic device, the thickness of the portable electronic device increases as the number of lenses increases, and thus, there is a problem in miniaturizing the portable electronic device.

In detail, since the telephoto camera has a relatively long focal length, there may be a problem that it may be difficult to apply to a thin portable electronic device.

In addition, in the case of a camera having a shake correction function, a lens module including a plurality of lenses is generally moved. In this case, there is a problem in which power consumption may be increased due to the weight of the lens module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An optical imaging system that may be mounted in a portable electronic device having a relatively reduced thickness and has a relatively long focal length.

In one general aspect, an optical imaging system includes a reflective member having a reflective surface to change an optical path of light, a first lens having positive refractive power, a second lens having negative refractive power, a third lens, a fourth lens, and a fifth lens. The first lens to the fifth lens are sequentially disposed along an optical axis from an object side and are each disposed closer to an image sensor than the reflective member. The optical imaging system satisfies 0.2 mm<C1.0<0.3 mm, where C1.0 is a distance by which the image sensor moves in a direction perpendicular to the optical axis with respect to a shake amount of 1.0° measured by a shake detection unit.

The optical imaging system may satisfy 0.1<L1S1/f<1, where L1S1 is a radius of curvature of an object-side surface of the first lens and f is a total focal length of the optical imaging system.

The optical imaging system may satisfy −2.0<(L1S1+L1S2)/(L1S1−L1S2)<−0.1, where L1S2 is a radius of curvature of an image-side surface of the first lens.

The optical imaging system may satisfy −2.0<L3S2/f<−0.1, where L3S2 is a radius of curvature of an image-side surface of the third lens and f is a total focal length of the optical imaging system.

The optical imaging system may satisfy −20.0<(L3S1+L3S2)/(L3S1−L3S2)<−0.1, where L3S1 is a radius of curvature of an object-side surface of the third lens.

The optical imaging system may satisfy 0.1<f/f1<5.0, where f is a total focal length of the optical imaging system and f1 is a focal length of the first lens.

The optical imaging system may satisfy −1.0 21 f/f3<−0.1, where f is a total focal length of the optical imaging system and f3 is a focal length of the third lens.

The optical imaging system may satisfy −1.0<f/f4<−0.1, where f is a total focal length of an optical system and f4 is a focal length of the fourth lens.

The optical imaging system may satisfy 0.1<f/f5<2.0, where f is a total focal length of an optical system and f5 is a focal length of the fifth lens.

The optical imaging system may satisfy 0.5<BFL/TTL<0.7, where TTL is a distance from an object-side surface of the first lens to an imaging plane of the image sensor on the optical axis, and BFL is a distance from an image-side surface of the fifth lens to the imaging plane of the image sensor on the optical axis.

The optical imaging system may satisfy 1.8<TTL/(2*IMG HT)<2.2, where TTL is a distance from an object-side surface of the first lens to an imaging plane of the image sensor on the optical axis, and IMG HT is half of a diagonal length of the imaging plane of the image sensor.

The optical imaging system may satisfy 0.8<TTL/f<1.1, where TTL is a distance from an object-side surface of the first lens to an imaging plane of the image sensor on the optical axis, and f is a total focal length of the optical imaging system.

The optical imaging system may satisfy f1/|f23|<1.0, where f1 is a focal length of the first lens and f23 is a combined focal length of the second lens and the third lens.

The optical imaging system may satisfy 0.1 mm<C0.5<0.2 mm, where C0.5 is a distance by which the image sensor moves in the direction perpendicular to the optical axis with respect to an amount of shake of 0.5° measured by the shake detection unit.

The optical imaging system may satisfy 0.35 mm<C1.5<0.45 mm, where C1.5 is a distance by which the image sensor moves in the direction perpendicular to the optical axis with respect to an amount of shake of 1.5° measured by the shake detection unit.

The optical imaging system may satisfy 0.5 mm<C2.0<0.6 mm, where C2.0 is a distance by which the image sensor moves in the direction perpendicular to the optical axis with respect to an amount of shake of 2.0° measured by the shake detection unit.

In another general aspect, an optical imaging system includes a reflective member to change an optical path of light, a first lens, a second lens, a third lens, a fourth lens, a fifth lens, an image sensor, and a shake detection unit to measure an amount of shake of the optical imaging system when capturing an image. The first lens to the fifth lens are sequentially disposed along an optical axis from an object side and are each disposed between the image sensor and the reflective member along the optical axis. The optical imaging system satisfies 0.13 mm<C<0.523 mm, where C is a distance by which the image sensor moves in a direction perpendicular to the optical axis in a case in which the amount of shake measured by the shake detection unit is between 0.5° and 2.0° inclusive.

Other features and aspects will be apparent from the following detailed description, the drawings, and the claims.

BRIEF DESCRIPTION OF THE DRAWINGS

FIG. 6 is a curve illustrating aberration characteristics of the optical imaging system illustrated in FIG. 5.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
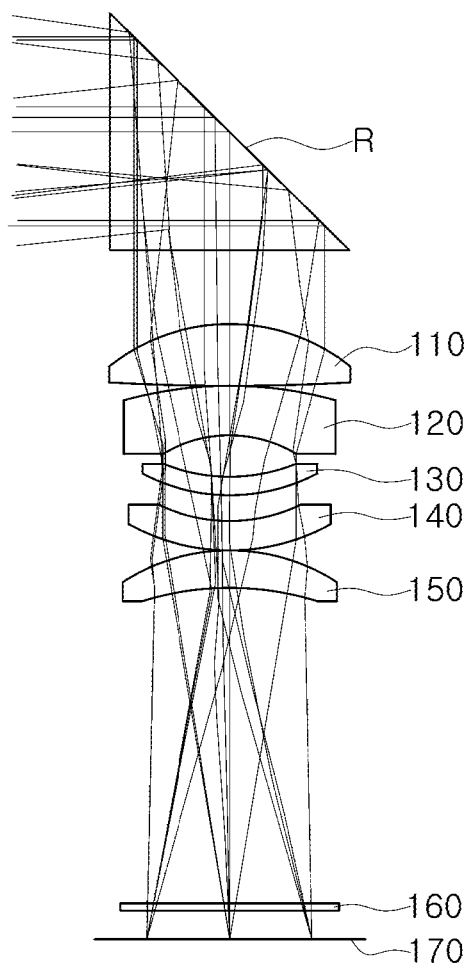
FIG. 1 is a configuration diagram of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the following lens configuration diagram, the thickness, size, and shape of the lens are illustrated to be somewhat exaggerated for explanation. In particular, the shape of the spherical or aspherical surface presented in the lens configuration diagram is provided as an example, and the shape of the spherical or aspherical surface is not limited thereto.

An optical imaging system according to an example may include a plurality of lenses disposed along an optical axis. The plurality of lenses may be spaced apart from each other by a predetermined distance along the optical axis.

As an example, the optical imaging system may include five lenses.

A first lens refers to a lens closest to an object side (or a reflective member), and a fifth lens refers to a lens closest to an image sensor.

Further, in each lens, a first surface means a surface close to the object side (or an object side surface), and a second surface means a surface close to the image side (or an image side surface). In addition, in this specification, the numerical values for radii of curvature, thickness, etc. of the lens are all in mm, and the unit of angle measurement is degrees.

In addition, in the description of the shape of each lens, the meaning that one surface is convex indicates that the paraxial region portion of the surface is convex, and the meaning that one surface is concave indicates that the paraxial region portion of the surface is concave.

The paraxial region refers to a relatively narrow region near the optical axis.

The optical imaging system according to an example includes five lenses.

For example, the optical imaging system includes a first lens, a second lens, a third lens, a fourth lens, and a fifth lens arranged in order from the object side.

However, the optical imaging system according to the example is not only comprised of five lenses, and may further include other components.

For example, the optical imaging system may further include a reflective member having a reflective surface that changes an optical path. For example, the reflective member may be a mirror or a prism.

The reflective member is disposed closer to the object side than the plurality of lenses. For example, the reflective member may be disposed closer to the object side than the first lens. Therefore, the lens disposed closest to the object side may be a lens disposed closest to the reflective member.

Light incident on the reflective member may be curved to be directed to the first to fifth lenses.

In addition, the optical imaging system may further include an image sensor for converting an incident image of the object into an electrical signal.

In addition, the optical imaging system may further include an infrared blocking filter (hereinafter, referred to as a 'filter') for blocking infrared light. The filter is disposed between the lens (the fifth lens) disposed closest to the image sensor and the image sensor.

All lenses constituting the optical imaging system according to an example may be formed of a plastic material.

The optical imaging system according to an example is configured in such a manner that the image sensor may be moved to correct shake of an image. As an example, the image sensor of the optical imaging system according to an example may be moved in a direction perpendicular to the optical axis.

For example, when shake occurs due to user hand-shake or the like when an image is captured, the shake may be corrected by applying a relative displacement corresponding to the shake to the image sensor.

Although not illustrated in the drawings, a shake correction unit may be provided to move the image sensor, and the shake correction unit may include a VCM actuator using a magnet and a coil.

The image sensor of the optical imaging system may be moved in a direction perpendicular to the optical axis, based on a detection signal from a shake detection unit (e.g., a gyro sensor).

Each of the plurality of lenses may have at least one aspherical surface.

For example, at least one of the first and second surfaces of the first to fifth lenses may be aspherical. In this case, the aspherical surfaces of the first to fifth lenses are expressed by Equation 1.

$$Z = \frac{cY^2}{1+\sqrt{1-(1+K)c^2Y^2}} + AY^4 + BY^6 + CY^8 + DY^{10} + EY^{12} \quad \text{Equation 1}$$

In Equation 1, c is the curvature of the lens (a reciprocal of the radius of curvature), K is a conic constant, and Y represents a distance from any point on an aspherical surface of the lens to an optical axis. In addition, constants A to E indicate aspheric coefficients. Z represents a distance (SAG) from any point on an aspherical surface of the lens to a vertex of the aspherical surface.

The optical imaging system according to an example may satisfy at least one of the following conditional expressions.

Conditional Expression 1: 0.1 mm<C0.5<0.2 mm
Conditional Expression 2: 0.2 mm<C1.0<0.3 mm
Conditional Expression 3: 0.35 mm<C1.5<0.45 mm
Conditional Expression 4: 0.5 mm<C2.0<0.6 mm
Conditional Expression 5: 0.1<L1S1/f<1
Conditional Expression 6: −2.0<(L1S1+L1S2)/(L1S1−L1S2)<−0.1
Conditional Expression 7: −2.0<L3S2/f<−0.1
Conditional Expression 8: −20.0<(L3S1+L3S2)/(L3S1−L3S2)<−0.1
Conditional Expression 9: 0.1<f/f1<5.0
Conditional Expression 10: −1.0<f/f3<−0.1
Conditional Expression 11: −1.0<f/f4<−0.1
Conditional Expression 12: 0.1<f/f5<2.0
Conditional Expression 13: 0.5<BFL/TTL<0.7
Conditional Expression 14: 1.8<TTL/(2*IMG HT)<2.2
Conditional Expression 15: 0.8<TTL/f<1.1
Conditional Expression 16: f1/|f23|<1.0

In the conditional expressions, C0.5 is a moving distance of the image sensor with respect to a shake amount of 0.5°, C1.0 is a moving distance of the image sensor with respect to a shake amount of 1.0°, C1.5 is a moving distance of the image sensor with respect to a shake amount of 1.5°, and C2.0 is a moving distance of the image sensor with respect to a shake amount of 2.0°.

In this case, the shake amount may be an amount of shake of an image measured by the shake detection unit (for example, a gyro sensor), and the moving distance of the image sensor may indicate a moving distance in a direction perpendicular to the optical axis.

In the conditional expressions, L1S1 is a radius of curvature of the object-side surface of the first lens, L1S2 is a radius of curvature of the image-side surface of the first lens, L3S1 is a radius of curvature of the object-side surface of the third lens, and L3S2 is a radius of curvature of the image side-surface of the third lens.

In the conditional expressions, f1 is a focal length of the first lens, f3 is a focal length of the third lens, f4 is a focal length of the fourth lens, f5 is a focal length of the fifth lens, f23 is a combined focal length of the second and third lenses, and f is a total focal length of the optical imaging system.

In the conditional expressions, BFL is a distance from the image-side surface of the fifth lens to the imaging plane of the image sensor on the optical axis, and TTL is a distance from the object-side surface of the first lens to the imaging plane of the image sensor on the optical axis.

In the conditional expressions, IMG HT is half a diagonal length of the imaging plane of the image sensor.

Next, first to fifth lenses constituting the optical imaging system according to an example will be described.

The first lens has positive refractive power. In addition, both surfaces of the first lens may be convex. In detail, the first surface and the second surface of the first lens may be convex.

In the first lens, at least one surface of the first surface and the second surface may be aspherical. For example, both surfaces of the first lens may be aspherical.

The second lens has negative refractive power. In addition, the second lens may have a meniscus shape convex toward the object. In other words, the first surface of the second lens may be convex, and the second surface of the second lens may be concave.

In the second lens, at least one surface of the first surface and the second surface may be aspherical. For example, both surfaces of the second lens may be aspherical.

The third lens has negative refractive power. In addition, the third lens may have a meniscus shape convex toward the image side. In detail, the first surface of the third lens may be concave, and the second surface of the third lens may be convex.

In the third lens, at least one surface of the first surface and the second surface may be aspherical. For example, both surfaces of the third lens may be aspherical.

The fourth lens has negative refractive power. In addition, the fourth lens may have a meniscus shape convex toward the image side. In detail, the first surface of the fourth lens may be concave, and the second surface of the fourth lens may be convex.

In the fourth lens, at least one surface of the first surface and the second surface may be aspherical. For example, both surfaces of the fourth lens may be aspherical.

The fifth lens has positive refractive power. In addition, the fifth lens may have a meniscus shape convex toward the object. In detail, the first surface of the fifth lens may be convex, and the second surface of the fifth lens may be concave.

In the fifth lens, at least one surface of the first surface and the second surface may be aspherical. For example, both surfaces of the fifth lens may be aspherical.

Among the first to fifth lenses, the first lens has an absolute value of a smallest focal length.

Among the first to fifth lenses, the third lens has an absolute value of a greatest focal length.

A combined focal length of the second lens and the third lens has a value less than 0 (e.g., negative refractive power). The second lens and the third lens each have negative refractive power, but the example is not limited thereto. For example, the third lens may have positive refractive power in a range in which the combined focal length of the second lens and the third lens has a value less than zero.

The optical imaging system according to an example has a feature of a telephoto lens having a relatively narrow angle of view and a relatively long focal length.

An optical imaging system according to a first example will be described with reference to FIGS. 1 and 2.

An optical system according to the first example includes a first lens 110, a second lens 120, a third lens 130, a fourth lens 140, and a fifth lens 150, and may further include a filter 160 and an image sensor 170.

The optical imaging system may further include a reflective member R disposed closer to the object side than the first lens 110 and having a reflective surface changing an optical path. In the first example, the reflective member R may be a prism, or may also be provided as a mirror.

Lens characteristics of respective lenses, for example, radii of curvature, thicknesses of lens or distances between lenses, refractive indices, Abbe numbers, focal lengths, are as illustrated in Table 1.

TABLE 1

| Surface Number | Remark | Curvature Radius | Thickness or Distance | Refractive Index | Abbe number | Focal Length |
|---|---|---|---|---|---|---|
| S1 | Prism | Infinity | 2.6 | 1.717 | 29.5 | |
| S2 | | Infinity | 2.6 | 1.717 | 29.5 | |
| S3 | | Infinity | 2.2 | | | |
| S4 | First Lens | 4.44597 | 1.8 | 1.535 | 560 | 7.7108 |
| S5 | | −49.12118 | 0.04 | | | |
| S6 | Second Lens | 7.64035 | 1.06636 | 1.615 | 25.9 | −9.2765 |
| S7 | | 3.0926 | 1.2 | | | |
| S8 | Third Lens | −4.29081 | 0.47 | 1.6397 | 23.5 | −88.7246 |
| S9 | | −4.84008 | 0.5 | | | |
| S10 | Fourth Lens | −3.59392 | 0.85 | 1.615 | 25.9 | −53.0231 |
| S11 | | −4.40285 | 0.04 | | | |
| S12 | Fifth Lens | 3.64359 | 0.87926 | 1.535 | 560 | 19.2670 |
| S13 | | 5.16167 | 8.07395 | | | |
| S14 | Filter | Infinity | 0.14993 | 1.516 | 64.1 | |
| S15 | | Infinity | 0.92974 | | | |
| S16 | Imaging Plane | Infinity | | | | |

A total focal length f of the optical imaging system according to the first example is 15 mm, BFL is 9.154 mm, TTL is 15.999 mm, and IMG HT is 4.2 mm.

A combined focal length f23 of the second lens 120 and the third lens 130 is −8.6322 mm.

In the first example, the first lens 110 has positive refractive power, and the first and second surfaces of the first lens 110 are convex.

The second lens 120 has negative refractive power, the first surface of the second lens 120 is convex, and the second surface of the second lens 120 is concave.

The third lens 130 has negative refractive power, the first surface of the third lens 130 is concave, and the second surface of the third lens 130 is convex.

The fourth lens 140 has negative refractive power, the first surface of the fourth lens 140 is concave, and the second surface of the fourth lens 140 is convex.

The fifth lens 150 has positive refractive power, the first surface of the fifth lens 150 is convex, and the second surface of the fifth lens 150 is concave.

Each surface of the first lens 110 to the fifth lens 150 has an aspherical surface coefficient as illustrated in Table 2. For example, both the object-side surface and the image-side surface of the first lens 110 to the fifth lens 150 are aspherical surfaces.

TABLE 2

|  | K | A | B | C | D | E |
|---|---|---|---|---|---|---|
| S4 | −0.640837 | 0.0008149 | 1.99E−05 | 2.22E−06 | −7.07E−07 | 0 |
| S5 | 0 | 0.0005221 | −3.30E−05 | −1.51E−05 | 1.22E−06 | 0 |
| S6 | 0 | −3.04E−03 | −1.97E−05 | 6.01E−07 | 1.07E−06 | 0 |
| S7 | 0 | −0.00384 | −2.32E−04 | 5.63E−05 | −4.94E−06 | 0 |
| S8 | 0 | 4.90E−03 | 1.65E−03 | −5.70E−04 | 6.23E−05 | 0 |
| S9 | 0 | −1.91E−03 | 0.0039516 | −0.001312 | 1.69E−04 | −7.99E−06 |
| S10 | 0 | 1.05E−02 | −0.000387 | −0.000487 | 1.06E−04 | −9.43E−06 |
| S11 | −2.50E+00 | 5.51E−04 | −0.000376 | 3.45E−05 | 2.06E−06 | −7.74E−07 |
| S12 | 0 | −1.45E−02 | 1.54E−03 | −8.75E−05 | 2.50E−07 | 8.26E−08 |
| S13 | 0 | −7.22E−03 | 4.71E−04 | 4.30E−05 | −6.63E−06 | 3.06E−07 |

Figure 2:
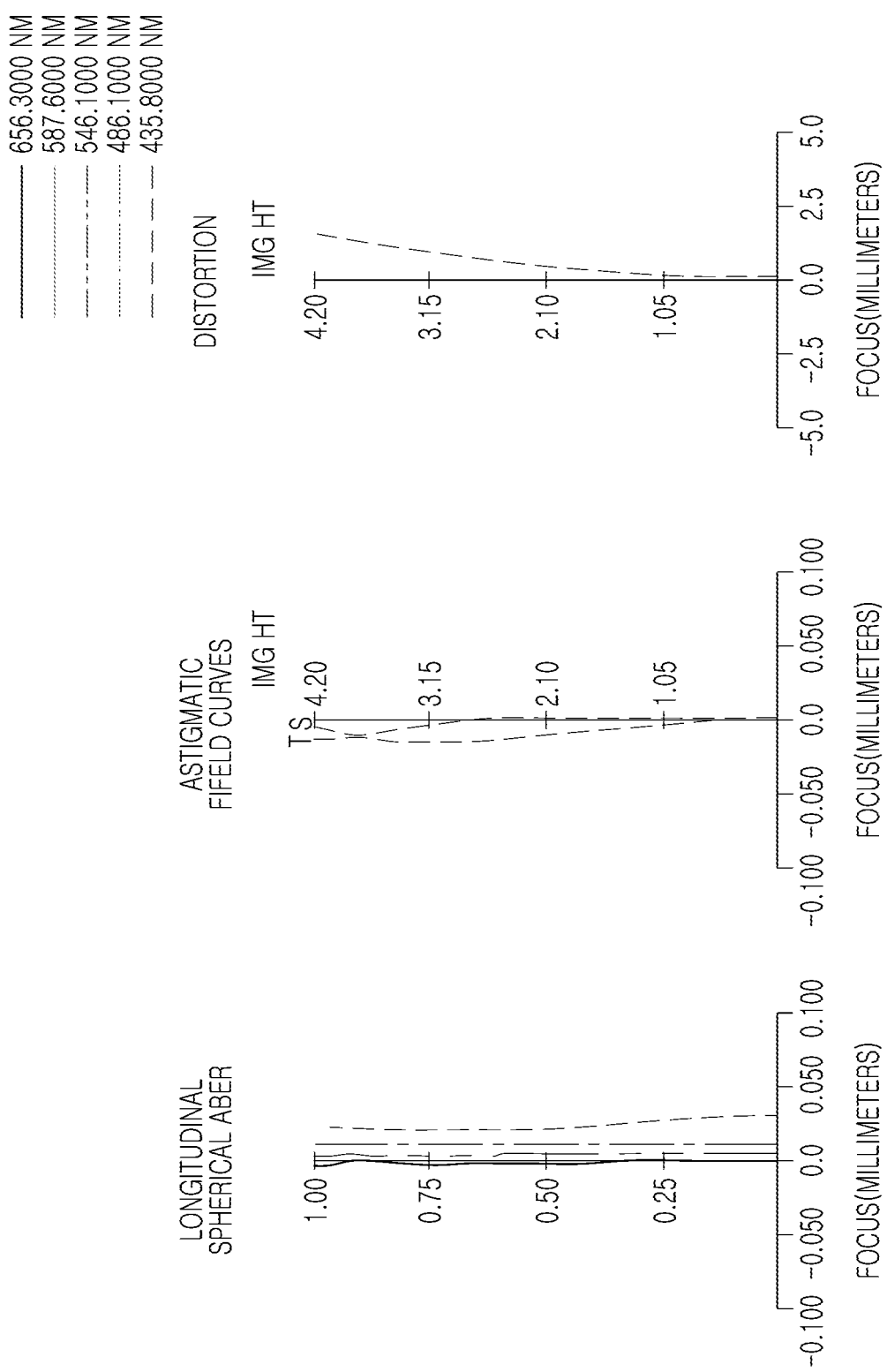
FIG. 2 is a curve illustrating aberration characteristics of the optical imaging system illustrated in FIG. 1.

In addition, the optical imaging system configured as described above may have aberration characteristics illustrated in FIG. 2.

Figure 3:
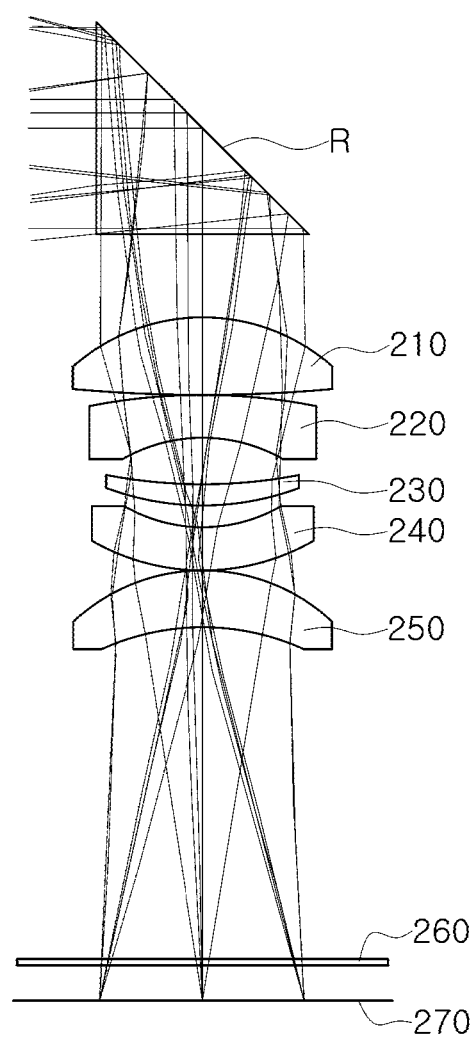
FIG. 3 is a configuration diagram of an optical imaging system according to a second example.

An optical imaging system according to a second example will be described with reference to FIGS. 3 and 4.

The optical imaging system according to the second example includes a first lens 210, a second lens 220, a third lens 230, a fourth lens 240, and a fifth lens 250, and may further include a filter 260 and an image sensor 270.

The optical imaging system may further include a reflective member R disposed closer to the object side than the first lens 210 and having a reflective surface changing an optical path. In the second example, the reflective member R may be a prism, or may also be provided as a mirror.

Lens characteristics of each lens, for example, a radius of curvature, a thickness of lens or a distance between lenses, a refractive index, Abbe number, and a focal length are illustrated in Table 3.

The total focal length f of the optical imaging system according to the second example is 15 mm, BFL is 8.902 mm, TTL is 16.235 mm, and IMG HT is 4.0 mm.

In the second example, the first lens 210 has positive refractive power, and the first and second surfaces of the first lens 210 are convex.

The second lens 220 has negative refractive power, the first surface of the second lens 220 is convex, and the second surface of the second lens 220 is concave.

The third lens 230 has negative refractive power, the first surface of the third lens 230 is concave, and the second surface of the third lens 230 is convex.

The fourth lens 240 has negative refractive power, the first surface of the fourth lens 240 is concave, and the second surface of the fourth lens 240 is convex.

The fifth lens 250 has positive refractive power, the first surface of the fifth lens 250 is convex, and the second surface of the fifth lens 250 is concave.

Each surface of the first lens 210 to the fifth lens 250 has an aspherical surface coefficient as illustrated in Table 4. For example, both the object-side surface and the image-side surface of the first lens 210 to the fifth lens 250 are aspherical surfaces.

TABLE 3

| Surface Number | Remark | Curvature Radius | Thickness or Distance | Refractive Index | Abbe number | Focal Length |
|---|---|---|---|---|---|---|
| S1 | Prism | Infinity | 2.6 | 1.717 | 29.5 |  |
| S2 |  | Infinity | 2.6 | 1.717 | 29.5 |  |
| S3 |  | Infinity | 2.2 |  |  |  |
| S4 | First Lens | 4.51189 | 1.80714 | 1.535 | 560 | 7.9179 |
| S5 |  | −59.62357 | 0.04 |  |  |  |
| S6 | Second Lens | 7.97843 | 0.98732 | 1.615 | 25.9 | −10.1740 |
| S7 |  | 3.34157 | 1.12724 |  |  |  |
| S8 | Third Lens | −6.7276 | 0.48137 | 1.6397 | 23.5 | −72.7400 |
| S9 |  | −8.08422 | 0.55656 |  |  |  |
| S10 | Fourth Lens | −3.3 | 1.0333 | 1.615 | 25.9 | −35.5665 |
| S11 |  | −4.34972 | 0.04 |  |  |  |
| S12 | Fifth Lens | 3.52947 | 1.29659 | 1.535 | 560 | 16.9720 |
| S13 |  | 5.03452 | 7.95097 |  |  |  |
| S14 | Filter | Infinity | 0.11 | 1.516 | 64.1 |  |
| S15 |  | Infinity | 0.84142 |  |  |  |
| S16 | Imaging Plane | Infinity |  |  |  |  |

TABLE 4

|  | K | A | B | C | D | E |
|---|---|---|---|---|---|---|
| S4 | −0.614611 | 0.0008302 | 2.31E−05 | 2.55E−06 | −2.80E−07 | 4.24E−09 |
| S5 | 0 | −0.000139 | 2.77E−05 | −8.77E−06 | 7.67E−07 | −3.37E−08 |
| S6 | 0 | −3.48E−03 | −9.51E−05 | 9.42E−06 | −6.55E−07 | 0 |
| S7 | 0 | −0.00284 | −2.38E−04 | 5.67E−05 | −1.00E−05 | 0 |
| S8 | 0 | 3.82E−03 | 1.96E−03 | −4.12E−04 | 2.66E−05 | 0 |
| S9 | 0 | −1.33E−03 | 0.0030535 | −0.00092 | 1.02E−04 | −8.44E−06 |
| S10 | 0 | 1.60E−02 | −0.002941 | 0.0001628 | 3.00E−05 | −9.49E−06 |
| S11 | −2.66E+00 | 9.28E−04 | −0.000862 | 1.69E−04 | −7.43E−06 | −1.37E−07 |
| S12 | 0 | −1.38E−02 | 1.43E−03 | −9.04E−05 | 4.22E−06 | −2.46E−07 |
| S13 | 0 | −5.87E−03 | 5.04E−04 | −2.04E−05 | 5.58E−06 | −3.39E−07 |

Figure 4:
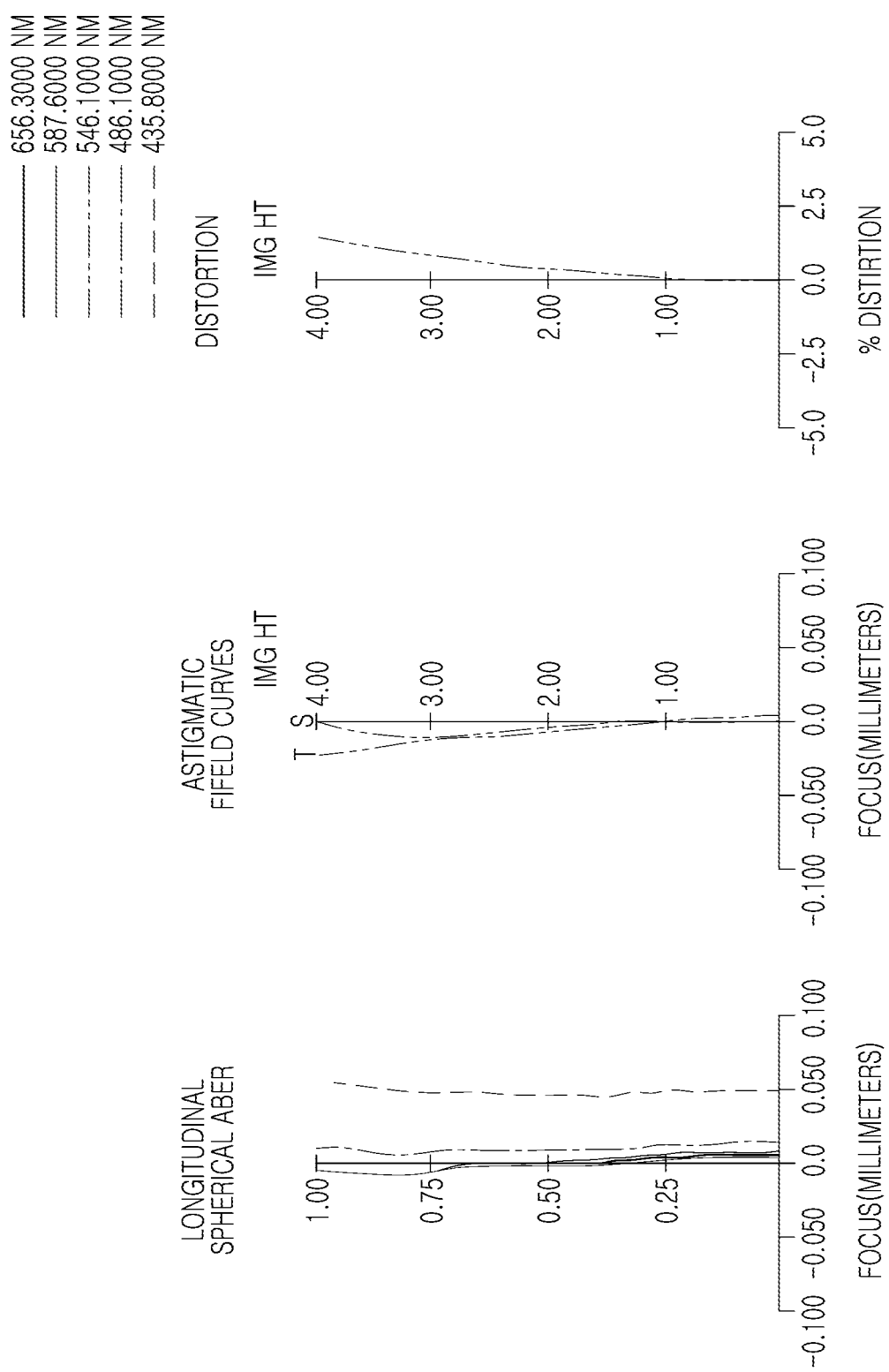
FIG. 4 is a curve illustrating aberration characteristics of the optical imaging system illustrated in FIG. 3.

In addition, the optical imaging system configured as described above may have aberration characteristics illustrated in FIG. 4.

Figure 5:
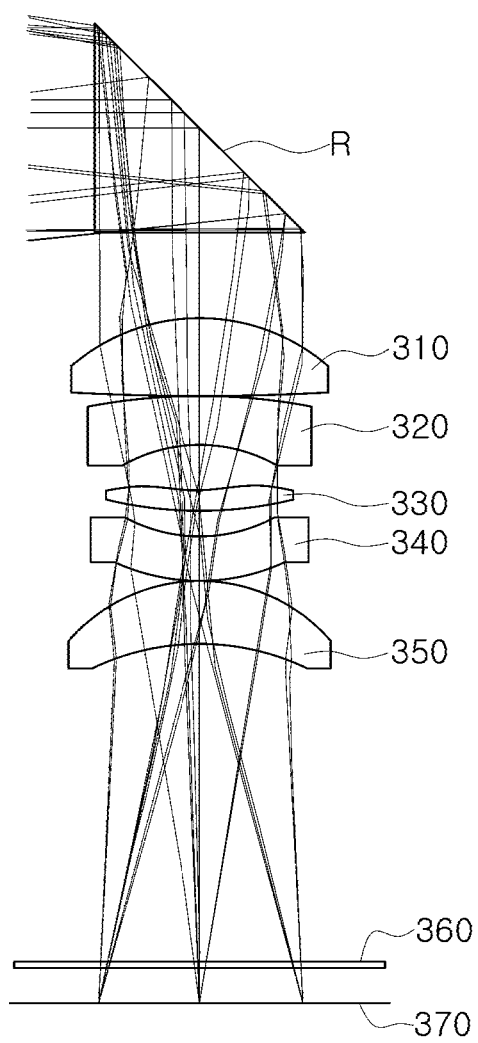
FIG. 5 is a configuration diagram of an optical imaging system according to a third example.

An optical imaging system according to a third example will be described with reference to FIGS. 5 and 6.

The optical imaging system according to the third example includes a first lens 310, a second lens 320, a third lens 330, a fourth lens 340, and a fifth lens 350, and may further include a filter 360 and an image sensor 370.

The optical imaging system may further include a reflective member R disposed closer to the object side than the first lens 310 and having a reflective surface changing an optical path. In the third example, the reflective member R may be a prism, or may also be provided as a mirror.

The lens characteristics of each lens, for example, a radius of curvature, a thickness of lens or a distance between lenses, a refractive index, Abbe number, and a focal length are illustrated in Table 5.

The total focal length f of the optical imaging system according to the third example is 15 mm, BFL is 8.567 mm, TTL is 16.235 mm, and IMG HT is 4.2 mm.

In the third example, the first lens 310 has positive refractive power, and the first and second surfaces of the first lens 310 are convex.

The second lens 320 has negative refractive power, the first surface of the second lens 320 is convex, and the second surface of the second lens 320 is concave.

The third lens 330 has negative refractive power, the first surface of the third lens 330 is concave, and the second surface of the third lens 330 is convex.

The fourth lens 340 has negative refractive power, the first surface of the fourth lens 340 is concave, and the second surface of the fourth lens 340 is convex.

The fifth lens 350 has positive refractive power, the first surface of the fifth lens 350 is convex, and the second surface of the fifth lens 350 is concave.

Each surface of the first lens 310 to the fifth lens 350 has an aspherical surface coefficient as illustrated in Table 6. For example, both the object-side surface and the image-side surface of the first lens 310 to the fifth lens 350 are aspherical surfaces.

TABLE 5

| Surface Number | Remark | Curvature Radius | Thickness or Distance | Refractive Index | Abbe number | Focal Length |
|---|---|---|---|---|---|---|
| S1 | Prism | Infinity | 2.6 | 1.717 | 29.5 |  |
| S2 |  | Infinity | 2.6 | 1.717 | 29.5 |  |
| S3 |  | Infinity | 2.2 |  |  |  |
| S4 | First Lens | 4.58468 | 1.84036 | 1.535 | 560 | 8.0553 |
| S5 |  | −61.77669 | 0.04 |  |  |  |
| S6 | Second Lens | 8.09869 | 1.06664 | 1.615 | 25.9 | −9.8933 |
| S7 |  | 3.3 | 1.08808 |  |  |  |
| S8 | Third Lens | −15.94159 | 0.48997 | 1.6397 | 23.5 | 90.6914 |
| S9 |  | −22.24539 | 0.65863 |  |  |  |
| S10 | Fourth Lens | −3.3 | 1.05572 | 1.615 | 25.9 | 43.5018 |
| S11 |  | −4.22291 | 0.04 |  |  |  |
| S12 | Fifth Lens | 3.61122 | 1.38832 | 1.535 | 560 | 18.0224 |
| S13 |  | 5 | 7.71747 |  |  |  |
| S14 | Filter | Infinity | 0.11 | 1.516 | 64.1 |  |
| S15 |  | Infinity | 0.73967 |  |  |  |
| S16 | Imaging Plane | Infinity |  |  |  |  |

TABLE 6

|  | K | A | B | C | D | E |
|---|---|---|---|---|---|---|
| S4 | −0.632149 | 0.0008137 | 7.83E−06 | 4.60E−06 | −4.53E−07 | 3.71E−09 |
| S5 | 0 | −0.000197 | 3.55E−05 | −1.04E−05 | 8.25E−07 | −3.54E−08 |
| S6 | 0 | −3.65E−03 | −5.31E−05 | 7.20E−06 | −4.57E−07 | 0 |
| S7 | 0 | −0.003515 | 6.96E−06 | 1.74E−05 | −2.81E−06 | 0 |
| S8 | 0 | 2.46E−03 | 2.80E−03 | −6.76E−04 | 6.11E−05 | 0 |
| S9 | 0 | −1.26E−03 | 0.0036059 | −0.001124 | 1.04E−04 | −6.92E−06 |
| S10 | 0 | 1.70E−02 | −0.003299 | 0.0004748 | −7.03E−05 | −1.05E−06 |
| S11 | −3.02E+00 | −3.33E−04 | −0.00015 | 1.02E−04 | −1.18E−05 | 1.14E−06 |
| S12 | 0 | −1.40E−02 | 1.99E−03 | −1.68E−04 | 8.16E−06 | −1.78E−07 |
| S13 | 0 | −6.56E−03 | 5.30E−04 | 5.37E−05 | −1.01E−05 | 8.18E−07 |

In addition, the optical imaging system configured as described above may have aberration characteristics illustrated in FIG. 6.

TABLE 7

| Shake amount | Moving Distance of Image Sensor |
|---|---|
| 0.5 degree | 0.130 mm |
| 1.0 degree | 0.261 mm |
| 1.5 degrees | 0.392 mm |
| 2.0 degrees | 0.523 mm |

Table 7 illustrates the moving distance of the image sensor depending on the measured amount of shake in the optical imaging system according to the first to third examples.

As set forth above, an optical imaging system according to an example may be mounted in a portable electronic device having a relatively reduced thickness, and may have a long focal length.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a reflective member comprising a reflective surface configured to change an optical path of light;
a first lens having positive refractive power;
a second lens having negative refractive power;
a third lens having negative refractive power;
a fourth lens; and
a fifth lens,
wherein the first lens to the fifth lens are sequentially disposed along an optical axis from an object side and are each disposed closer to an image sensor than the reflective member,
wherein $-20.0<(L3S1+L3S2)/(L3S1-L3S2)<-0.1$, where L3S1 is a radius of curvature of an object-side surface of the third lens and L3S2 is a radius of curvature of an image-side surface of the third lens, and
wherein $-1.0<f/f4<-0.1$, where f is a total focal length of an optical system and f4 is a focal length of the fourth lens.

2. The optical imaging system of claim 1, wherein $0.1<L1S1/f<1$, where L1S1 is a radius of curvature of an object-side surface of the first lens and f is a total focal length of the optical imaging system.

3. The optical imaging system of claim 2, wherein $-2.0<(L1S1+L1S2)/(L1S1-L1S2)<-0.1$, where L1S2 is a radius of curvature of an image-side surface of the first lens.

4. The optical imaging system of claim 1, wherein $-2.0<L3S2/f<-0.1$, where f is a total focal length of the optical imaging system.

5. The optical imaging system of claim 1, wherein $0.1<f/f1<5.0$, where f is a total focal length of the optical imaging system and f1 is a focal length of the first lens.

6. The optical imaging system of claim 1, wherein $-1.0<f/f3<-0.1$, where f is a total focal length of the optical imaging system and f3 is a focal length of the third lens.

7. The optical imaging system of claim 1, wherein $0.1<f/f5<2.0$, where f is a total focal length of an optical system and f5 is a focal length of the fifth lens.

8. The optical imaging system of claim 1, wherein $0.5<BFL/TTL<0.7$, where TTL is a distance from an object-side surface of the first lens to an imaging plane of the image sensor on the optical axis, and BFL is a distance from an image-side surface of the fifth lens to the imaging plane of the image sensor on the optical axis.

9. The optical imaging system of claim 1, wherein $1.8<TTL/(2*IMG\ HT)<2.2$, where TTL is a distance from an object-side surface of the first lens to an imaging plane of the image sensor on the optical axis, and IMG HT is half of a diagonal length of the imaging plane of the image sensor.

10. The optical imaging system of claim 1, wherein $0.8<TTL/f<1.1$, where TTL is a distance from an object-side surface of the first lens to an imaging plane of the image sensor on the optical axis, and f is a total focal length of the optical imaging system.

11. The optical imaging system of claim 1, wherein $f1/|f23|<1.0$, where f1 is a focal length of the first lens and f23 is a combined focal length of the second lens and the third lens.

12. The optical imaging system of claim 1, wherein 0.1 mm<C0.5<0.2 mm, where C0.5 is a distance by which the image sensor moves in the direction perpendicular to the optical axis with respect to an amount of shake of 0.5° measured by the shake detection unit.

13. The optical imaging system of claim 1, wherein 0.35 mm<C1.5<0.45 mm, where C1.5 is a distance by which the image sensor moves in the direction perpendicular to the optical axis with respect to an amount of shake of 1.5° measured by the shake detection unit.

14. The optical imaging system of claim 1, wherein 0.5 mm<C2.0<0.6 mm, where C2.0 is a distance by which the image sensor moves in the direction perpendicular to the optical axis with respect to an amount of shake of 2.0° measured by the shake detection unit.

15. The optical imaging system of claim 1, wherein 0.2 mm<C1.0<0.3 mm, where C1.0 is a distance by which the image sensor moves in a direction perpendicular to the optical axis with respect to an amount of shake of 1.0° measured by a shake detection unit.

16. An optical imaging system comprising:
a reflective member configured to change an optical path of light;
a first lens;
a second lens;
a third lens having negative refractive power;
a fourth lens;
a fifth lens; and
an image sensor,
wherein the first lens to the fifth lens are sequentially disposed along an optical axis from an object side and are each disposed between the image sensor and the reflective member along the optical axis,
wherein −20.0<(L3S1+L3S2)/(L3S1−L3S2)<−0.1, where L3S1 is a radius of curvature of an object-side surface of the third lens and L3S2 is a radius of curvature of an image-side surface of the third lens, and
wherein 0.5<BFL/TTL<0.7, where TTL is a distance from an object-side surface of the first lens to an imaging plane of the image sensor on the optical axis, and BFL is a distance from an image-side surface of the fifth lens to the imaging plane of the image sensor on the optical axis.

17. The optical imaging system of claim 16, further comprising a shake detection unit configured to measure an amount of shake of the optical imaging system when capturing an image,
wherein 0.13 mm<C<0.523 mm, where C is a distance by which the image sensor moves in a direction perpendicular to the optical axis in a case in which the amount of shake measured by the shake detection unit is between 0.5° and 2.0° inclusive.

18. An optical imaging system comprising:
a reflective member comprising a reflective surface configured to change an optical path of light;
a first lens having positive refractive power;
a second lens having negative refractive power;
a third lens having negative refractive power;
a fourth lens; and
a fifth lens,
wherein the first lens to the fifth lens are sequentially disposed along an optical axis from an object side and are each disposed closer to an image sensor than the reflective member,
wherein −20.0<(L3S1+L3S2)/(L3S1−L3S2)<−0.1, where L3S1 is a radius of curvature of an object-side surface of the third lens and L3S2 is a radius of curvature of an image-side surface of the third lens, and
wherein 0.1<f/f5<2.0, where f is a total focal length of an optical system and f5 is a focal length of the fifth lens.

* * * * *